(12) United States Patent
Kurashige et al.

(10) Patent No.: US 12,038,147 B2
(45) Date of Patent: Jul. 16, 2024

(54) LIGHTING SYSTEM AND METHOD OF DESIGNING LIGHTING SYSTEM

(71) Applicant: DAI NIPPON PRINTING CO., LTD., Tokyo (JP)

(72) Inventors: Makio Kurashige, Tokyo (JP); Shumpei Nishio, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/278,452

(22) PCT Filed: Feb. 7, 2022

(86) PCT No.: PCT/JP2022/004652
§ 371 (c)(1),
(2) Date: Aug. 23, 2023

(87) PCT Pub. No.: WO2022/181305
PCT Pub. Date: Sep. 1, 2022

(65) Prior Publication Data
US 2024/0133534 A1 Apr. 25, 2024

(30) Foreign Application Priority Data
Feb. 25, 2021 (JP) ................. 2021-029081

(51) Int. Cl.
*F21S 43/20* (2018.01)
*F21V 5/04* (2006.01)
(Continued)

(52) U.S. Cl.
CPC ............. *F21S 43/26* (2018.01); *F21V 5/04* (2013.01); *F21W 2103/60* (2018.01); *F21Y 2113/30* (2023.05)

(58) Field of Classification Search
CPC ................... F21S 43/26; F21V 5/04
See application file for complete search history.

(56) References Cited

U.S. PATENT DOCUMENTS

| 8,820,967 B2* | 9/2014 | Hikmet | G02B 27/0977 |
| | | | 362/296.01 |
| 2012/0044090 A1* | 2/2012 | Kahler | B60Q 1/245 |
| | | | 340/905 |

(Continued)

FOREIGN PATENT DOCUMENTS

| JP | 2012-215614 A | 11/2012 |
| JP | 2015-132707 A | 7/2015 |

(Continued)

OTHER PUBLICATIONS

English translation of the International Preliminary Report on Patentability, issued on Aug. 29, 2023, for the corresponding PCT Application No. PCT/JP2022/004652.

(Continued)

*Primary Examiner* — Bryon T Gyllstrom
(74) *Attorney, Agent, or Firm* — Michael Best & Friedrich LLP (57) ABSTRACT

A lighting system includes a projection surface and a lighting device that projects a projection pattern on the projection surface and includes a light source emitting coherent light and a diffractive optical element diffracting the coherent light to form the projection pattern and including fundamental pieces of diffractive optical element two-dimensionally arranged in a direction parallel to the projection surface. A fundamental period of spatial resolution r (on the projection surface and determined from a specified spatial resolution of the projection pattern at an intersection position of a perpendicular line drawn from a center of certain one of the fundamental pieces of diffractive optical element with respect to the projection surface), an angle $\theta$ (a half of an angle projecting the fundamental piece of diffractive optical element at the position), and a wavelength $\lambda$ of light in the (Continued)

projection pattern projected at the position) satisfy sin $\theta > \lambda/(6r)$.

7 Claims, 3 Drawing Sheets

(51) Int. Cl.
*F21W 103/60* (2018.01)
*F21Y 113/00* (2016.01)

(56) References Cited

U.S. PATENT DOCUMENTS

| 2017/0115497 | A1* | 4/2017 | Chen | H04N 13/207 |
| 2017/0166111 | A1* | 6/2017 | Baccarin | F21S 43/13 |
| 2018/0142840 | A1* | 5/2018 | Kurashige | G02B 26/12 |
| 2019/0285239 | A1* | 9/2019 | Erdl | F21S 43/13 |
| 2020/0318805 | A1* | 10/2020 | Kurashige | F21V 14/04 |
| 2021/0109359 | A1* | 4/2021 | Kurashige | G02B 27/0944 |

FOREIGN PATENT DOCUMENTS

| JP | 2018-156950 A | 10/2018 |
| JP | 2020-017526 A | 1/2020 |

OTHER PUBLICATIONS

International Search Report mailed on Apr. 19, 2022, for the corresponding PCT Application No. PCT/JP2022/004652, with English machine translation.

* cited by examiner

LIGHTING SYSTEM AND METHOD OF DESIGNING LIGHTING SYSTEM

CROSS-REFERENCE TO RELATED APPLICATIONS

This application is a National Entry application of PCT Application Serial Number PCT/JP2022/004652 filed on Feb. 7, 2022. Further, this application claims priority from Japanese Patent Application Number 2021-029081 filed on Feb. 25, 2021, the entire contents of which are hereby incorporated by reference into this application.

TECHNICAL FIELD

The present disclosure relates to a lighting system and a method of designing the lighting system.

BACKGROUND ART

A laser light source that emits coherent light may be used as a light source of a lighting device. In general, a laser light source has a smaller light emitting point size and a higher luminance than a light emitting device (LED). Since the laser light source emits coherent light, directivity can be made high, and thus it is possible to cause a sufficient amount of light to reach a far place. By using any of various optical elements such as a diffractive optical element or a lens array, a microdisplay, or the like, light distribution can be finely controlled.

There has been suggested a lighting device that projects a desired projection pattern by combining a laser light source and an optical element, such as one described in Japanese Unexamined Patent Application Publication No. 2015-132707. In the lighting device disclosed in Japanese Unexamined Patent Application Publication No. 2015-132707, laser light generated by a single light source is diffracted by a single optical element such as a hologram. A desired projection pattern is formed with light from the single light source through diffraction at the optical element. The projection pattern is projected on a projection surface distant from the lighting device.

When the laser light source as the light source of the lighting device and the diffractive optical element are used, a desired projection pattern can be projected without using an image forming optical system. When the laser light source is used as the light source of the lighting device, the divergence angle of light projected from the lighting device can be made small. As compared with a case where an LED is used as the light source, the projection pattern projected on the projection surface can be efficiently and sharply displayed.

SUMMARY OF INVENTION

When the projection surface is located far from the lighting device, the projection pattern may only be projected in such an unsharp manner that the projection pattern cannot be appropriately recognized. The sharpness of the projection pattern depends on the relationship between the optical element in the lighting device and the projection surface. By appropriately setting the relationship between the optical element in the lighting device and the projection surface, the projection pattern can be sharply projected so as to be recognizable. An object of the present disclosure is to appropriately project a pattern on a projection surface by an lighting device.

A first lighting system according to the present disclosure includes:
a projection surface; and
a lighting device that projects a projection pattern on the projection surface,
the lighting device includes a light source that emits coherent light, and a diffractive optical element that diffracts the coherent light from the light source to form the projection pattern,
the diffractive optical element includes a plurality of fundamental pieces of diffractive optical element two-dimensionally arranged in a direction parallel to the projection surface, and
a fundamental period of spatial resolution r that is on the projection surface and that is determined from a specified spatial resolution of the projection pattern at an intersection position of a perpendicular line drawn from a center of certain one of the fundamental pieces of diffractive optical element with respect to the projection surface, an angle θ that is a half of an angle projecting the fundamental piece of diffractive optical element at the position, and a wavelength λ of light included in the projection pattern projected at the position satisfy a relationship (i) below.

$$\sin \theta > \lambda/(6r) \quad (i)$$

A second lighting system according to the present disclosure includes:
a projection surface; and
a lighting device that projects a projection pattern on the projection surface,
the lighting device includes a light source that emits coherent light, and a diffractive optical element that diffracts the coherent light from the light source to form the projection pattern,
the diffractive optical element includes a plurality of fundamental pieces of diffractive optical element, and
a length L of a perpendicular line from a center of the fundamental piece of diffractive optical element to the projection surface, a fundamental period of spatial resolution r that is on the projection surface and that is determined from a specified spatial resolution of the projection pattern at a certain position on the projection surface, a length p of a cross section of the fundamental piece of diffractive optical element in a plane including a direction in which the fundamental period of spatial resolution r extends and a direction connecting the center of the fundamental piece of diffractive optical element and a center of the fundamental period of spatial resolution r, an angle δ formed by a line connecting the position and the center of the fundamental piece of diffractive optical element with respect to the perpendicular line from the center of the fundamental piece of diffractive optical element to the projection surface, and a wavelength λ of light included in the projection pattern projected at the position satisfy a relationship (ii) below.

$$L\lambda/(rp \cos^2 \delta) < 3 \quad (ii)$$

In the second lighting system according to the present disclosure, the angle δ formed by the line connecting the position and the center of the fundamental piece of diffractive optical element with respect to the perpendicular line from the center of the fundamental piece of diffractive optical element to the projection surface may be larger than 0°.

In the first or second lighting system according to the present disclosure, the projection pattern may include light having a wavelength in a visible light wavelength range and/or an electromagnetic wave having a wavelength in an infrared range.

A method of designing a first lighting system according to the present disclosure is a method of designing a lighting system that projects a projection pattern on a projection surface, the method including:

a step of determining a fundamental period of spatial resolution r that is on the projection surface and that is determined from a specified spatial resolution of the projection pattern at an intersection position of a perpendicular line drawn from a center of a certain fundamental piece of diffractive optical element with respect to the projection surface, and a wavelength λ of light included in the projection pattern at the position; and a step of determining a positional relationship between the projection surface and the lighting device so that an angle θ that is a half of an angle projecting the fundamental piece of diffractive optical element at the position satisfies a relationship (i) below.

$$\sin \theta > \lambda/(6r) \quad (i)$$

A method of designing a second lighting system according to the present disclosure is a method of designing a lighting system that projects a projection pattern on a projection surface, the method including:

a step of determining a fundamental period of spatial resolution r that is on the projection surface and that is determined from a specified spatial resolution of the projection pattern at a certain position on the projection surface, and a wavelength λ of light included in the projection pattern at the position;

a step of determining a length p of a cross section of a fundamental piece of diffractive optical element in a plane including a direction in which the fundamental period of spatial resolution r extends and a direction connecting a center of the fundamental piece of diffractive optical element and a center of the fundamental period of spatial resolution r; and a step of determining a positional relationship between the projection surface and the lighting device so that a length L of a perpendicular line from the center of the fundamental piece of diffractive optical element to the projection surface and an angle δ formed by a line connecting the position and the center of the fundamental piece of diffractive optical element with respect to the perpendicular line from the center of the fundamental piece of diffractive optical element to the projection surface satisfy a relationship (ii) below.

$$L\lambda/(rp \cos^2 \delta) < 3 \quad (ii)$$

According to the present disclosure, it is possible to appropriately project the pattern on the projection surface by the lighting device.

DESCRIPTION OF EMBODIMENTS

Hereinafter, an embodiment of the present disclosure will be described with reference to the drawings. Note that, in the drawings attached to the present description, for convenience of illustration and understanding, a scale, an aspect ratio, and the like are appropriately changed and exaggerated from those of an actual product.

For example, terms such as "parallel", "orthogonal", and "the same", values of lengths and angles, and the like for specifying shapes and geometric conditions and degrees thereof used in the present description are not limited by strict meanings, and are interpreted to include a range in which a similar function can be expected.

Figure 1:
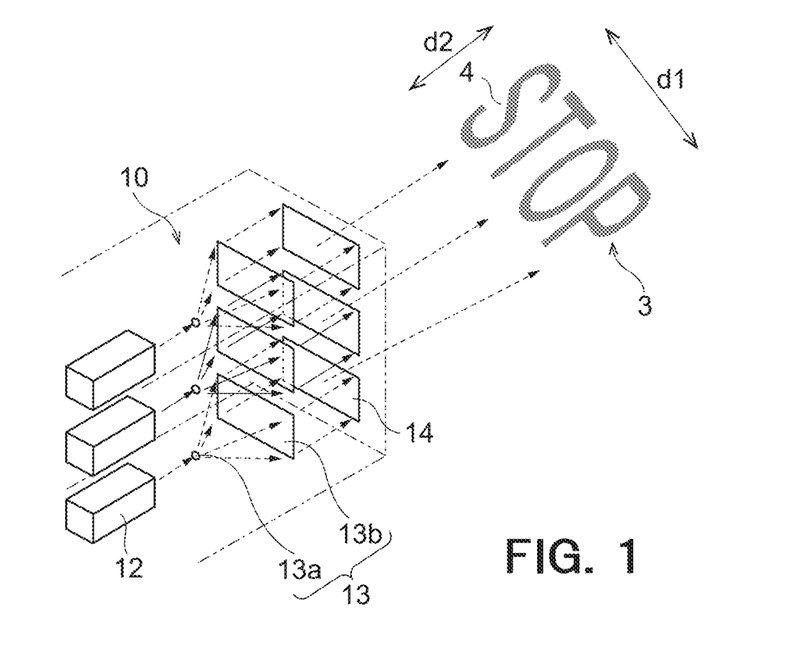
FIG. 1 is a perspective view schematically illustrating a general configuration of a lighting system.

FIG. 1 is a perspective view schematically illustrating a general configuration of a lighting system 1 according to the present embodiment. As illustrated in FIG. 1, the lighting system 1 includes a projection surface 3 and a lighting device 10. In the lighting system 1, a projection pattern 4 is projected on the projection surface 3 by the lighting device 10.

The projection surface 3 functions as a display surface that displays the projection pattern 4 projected from the lighting device 10 so as to be appropriately observed by a surrounding observer. The projection surface 3 is a surface distant from the lighting device 10. The projection surface 3 is preferably a flat surface so as to appropriately display the projection pattern 4. As illustrated in FIG. 1, in the present embodiment, the projection surface 3 has a predetermined width in a first direction d1 and extends in a second direction d2. The projection surface 3 is, for example, a part of a road surface of a road. The length of the projection surface 3 in the first direction d1 is determined particularly by a diffractive optical element 14 (described later) of the lighting device 10, and the length of the projection surface 3 in the second direction d2 is determined by the relationship between the projection surface 3 and the lighting device 10. In the illustrated example, the first direction d1 and the second direction d2 are orthogonal to each other.

The projection pattern 4 displays a predetermined pattern to be observed by the observer on the projection surface 3. The projection pattern 4 includes light having a wavelength in a visible light wavelength range. Specifically, the projection pattern 4 includes light having a wavelength λ of 380 nm or more and 700 nm or less. For example, the projection pattern 4 displays predetermined information to be observed by the observer. In the example illustrated in FIG. 1, characters "STOP" are displayed as the predetermined information. The information displayed by the projection pattern 4 may be any information, and may include not only characters but also patterns, images, symbols, numbers, and the like. The display color, size, character line type, and line width of the predetermined information may be desirably determined, and at least a part of the predetermined information may be color-coded with a plurality of colors.

The projection pattern 4 may include, for example, an electromagnetic wave having a wavelength in an infrared range other than the light in the visible light wavelength range. Specifically, the projection pattern 4 may include an electromagnetic wave having a wavelength of 780 nm or more and 3000 nm or less. In the projection pattern 4, the electromagnetic wave having the wavelength in the infrared range may be emitted at the same position as or a position different from a position at which the light in the visible light wavelength range is emitted simultaneously with the light in the visible light wavelength range. Alternatively, in the projection pattern 4, the electromagnetic wave having the wavelength in the infrared range may be emitted at a timing different from that of the light in the visible light wavelength range. The projection pattern 4 may include only the electromagnetic wave having the wavelength in the infrared range without including the light in the visible light wavelength range.

The projection pattern 4 may include an electromagnetic wave, for example, an ultraviolet ray, a millimeter wave, or a terahertz wave, other than the light in the visible light wavelength range and the electromagnetic wave in the infrared range described above.

In the present description, the term "light" includes not only light in the visible light wavelength range but also an electromagnetic wave in the infrared range or the like.

The lighting device 10 is a device that projects the projection pattern 4 on the projection surface 3. In the present embodiment, the lighting device 10 is a part of an installation type information indicator lamp. The lighting device 10 may be any of various lighting lamps such as a searchlight. The lighting device 10 may be mounted on any of various moving objects. The lighting device 10 can be mounted not only on a vehicle such as an automobile or a bicycle but also on a moving object such as a ship, an airplane, or a train. The lighting device 10 can be mounted on a terminal capable of displaying information, for example, a display of a computer, a mobile terminal such as a tablet or a smartphone, or a television set.

As illustrated in FIG. 1, the lighting device 10 includes a light source 12, a shaping optical system 13, and a diffractive optical element 14. The lighting device 10 may further include a housing that accommodates the light source 12, the shaping optical system 13, and the diffractive optical element 14. Hereinafter, each component of the lighting device 10 will be described.

The light source 12 emits coherent light that is light having uniform wavelength and phase. Any of various types of light sources can be used as the light source 12. Typically, a laser light source that oscillates laser light can be used as the light source 12 that emits coherent light. As a specific example, the light source 12 is configured as a semiconductor laser light source and is supported by, for example, a circuit board. In the example illustrated in FIG. 1, three light sources 12 that each emit light having a different wavelength are provided. The wavelength of light emitted by the light source 12 corresponds to the wavelength of light included in the projection pattern 4. For example, when the projection pattern 4 is projected so as to include light in the visible light wavelength range, the light source 12 emits light in the visible light wavelength range. Typically, the three light sources 12 emit coherent light in red, green, and blue wavelength ranges, respectively. The light source 12 may emit light in a wavelength range of another color. When the projection pattern 4 is projected so as to include light other than the light in the visible light wavelength range, for example, the projection pattern 4 includes an electromagnetic wave in the infrared range, the light source 12 emits an electromagnetic wave in the infrared range. The number of light sources 12 is not limited to the illustrated example, and may be any number.

The shaping optical system 13 shapes the light emitted from the light source 12. In other words, the shaping optical system 13 shapes the shape in a cross section orthogonal to the optical axis of the light from the light source 12 or the three-dimensional shape in a light emission space. Typically, the shaping optical system 13 enlarges the cross-sectional area of projection light in the cross section orthogonal to the optical axis of the light. In the illustrated example, the shaping optical system 13 shapes the light emitted from the light source 12 into widened parallel light. The shaping optical system 13 functions as a collimating optical system. As illustrated in FIG. 1, the shaping optical system 13 includes a first lens 13a and a second lens 13b in this order along an optical path of the coherent light. The first lens 13a shapes the light emitted from the light source 12 into divergent light. The second lens 13b reshapes the divergent light generated by the first lens 13a into parallel light. The second lens 13b functions as a collimator lens. In the example illustrated in FIG. 1, a plurality of shaping optical systems 13 are provided. The shaping optical system 13 is provided for each light source 12. The number of shaping optical systems 13 is the same as the number of light sources 12.

The diffractive optical element 14 diffracts the light having passed through the shaping optical system 13 to form the projection pattern 4. The light diffracted by the diffractive optical element 14 is projected on the projection surface 3. In the example illustrated in FIG. 1, a plurality of diffractive optical elements 14 are provided. The diffractive optical element 14 is provided for each shaping optical system 13. The number of diffractive optical elements 14 is the same as the number of shaping optical systems 13.

Figure 2:
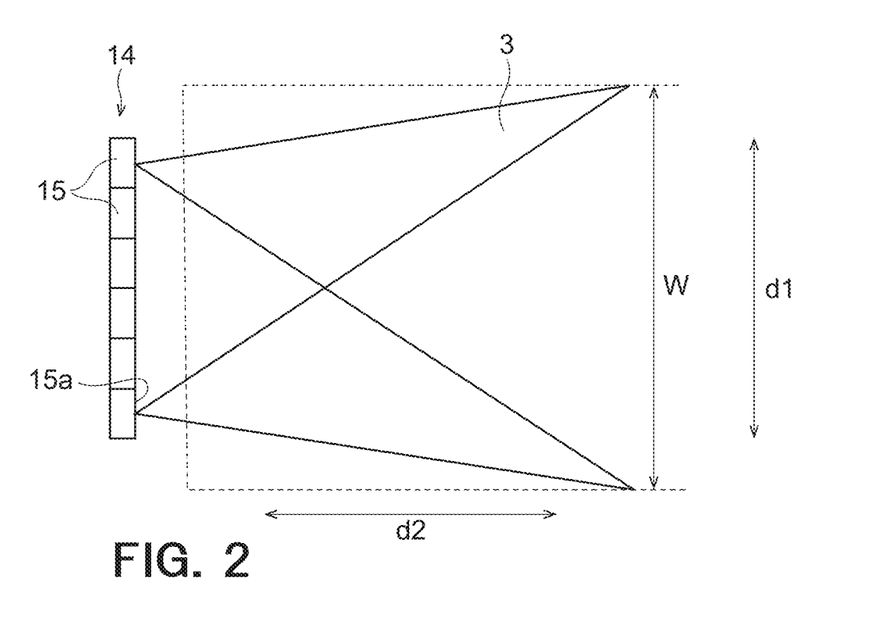
FIG. 2 is an enlarged plan view of the lighting system observed in the direction of the normal to a projection surface.

FIG. 2 illustrates an enlarged view of one diffractive optical element 14. As illustrated in FIG. 2, the diffractive optical element 14 includes a plurality of fundamental pieces of diffractive optical element 15. The plurality of fundamental pieces of diffractive optical element 15 are minute thin plate-like members, and are two-dimensionally arranged without a gap on the same plane in the diffractive optical element 14. The fundamental pieces of diffractive optical element 15 diffract light and emit the light from emission surfaces 15a. Each of the plurality of fundamental pieces of diffractive optical element 15 diffracts the light from the corresponding shaping optical system 13 to form the projection pattern 4 as a whole. Each of the fundamental pieces of diffractive optical element 15 may form the entire predetermined information displayed by the projection pattern 4, or may form a corresponding part of the predetermined information.

Since the diffraction characteristics of each of the fundamental pieces of diffractive optical element 15 are designed to correctly illuminate a corresponding lighting range of the projection surface 3, the projection pattern 4 projected on the projection surface 3 can appropriately display the predetermined information.

As illustrated in FIG. 2, the diffractive characteristics of each of the fundamental pieces of diffractive optical element 15 are adjusted so that an irradiation width w in the first direction d1 of light diffracted by one fundamental piece of diffractive optical element 15 and being incident at any position in the second direction d2 of the projection surface 3 is the same as an irradiation width w in the first direction d1 of light diffracted by another fundamental piece of diffractive optical element 15 and being incident at the any position in the second direction d2 of the projection surface 3.

The fundamental piece of diffractive optical element 15 is typically a hologram element. By using the hologram element as the fundamental piece of diffractive optical element 15, the diffraction characteristics can be easily designed, and a hologram element capable of displaying information whose position, size, and shape are determined in advance on the projection surface 3 can be relatively easily designed.

When the fundamental piece of diffractive optical element 15 is constituted by the hologram element, by using a computer generated hologram (CGH), the above-described diffraction characteristics can be relatively easily designed by using a computer.

The fundamental piece of diffractive optical element 15 may be a phase type diffractive optical element or an amplitude type diffractive optical element. The fundamental piece of diffractive optical element 15 is configured as a transmissive type in the example illustrated in FIG. 1, but may be configured as a reflective type. When the fundamental piece of diffractive optical element 15 is configured as the phase type diffractive optical element, the fine structure constituting the fundamental piece of diffractive optical element 15 may be a surface relief pattern structure in which the optical path length varies depending on the incident position of light or a pattern structure in which the refractive index varies depending on the incident position of light. The fine structure composed of the surface relief pattern is preferable in that it can be mass-produced by resin molding using a photolithography technique. When the fundamental piece of diffractive optical element 15 is configured as the amplitude type diffractive optical element, the fine structure constituting the fundamental piece of diffractive optical element 15 can employ a structure in which the transmittance varies depending on the incident position of light.

Next, the relationship between the projection surface 3 and the diffractive optical element 14, in particular the fundamental piece of diffractive optical element 15, of the lighting device 10 in the lighting system 1 will be described.

Figure 3A:
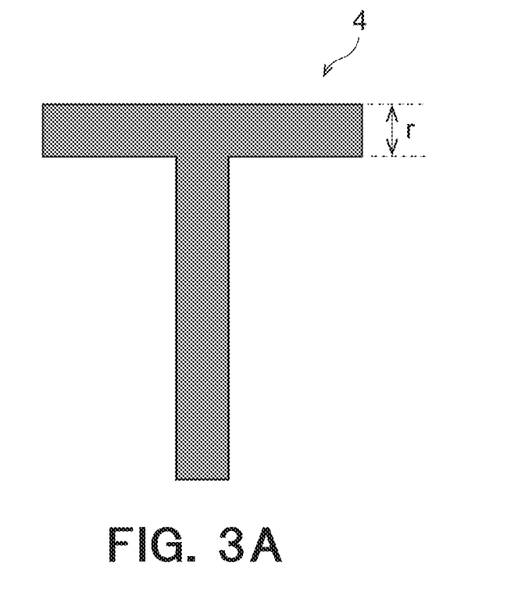
FIG. 3A is an enlarged view illustrating a part of an example of a projection pattern projected on the projection surface.
Figure 3B:
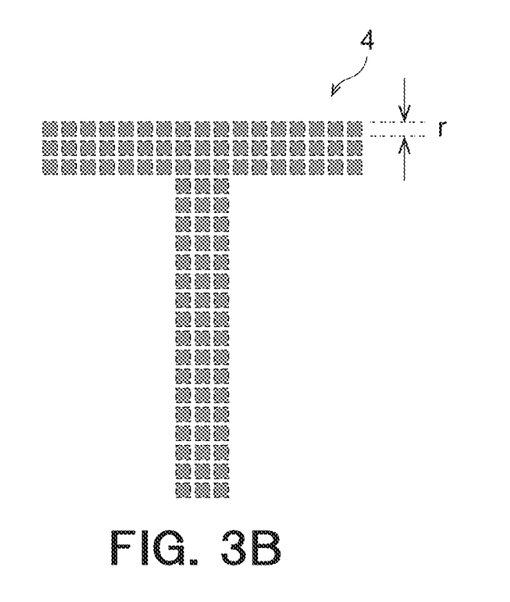
FIG. 3B is an enlarged view illustrating a part of another example of the projection pattern projected on the projection surface.

In FIG. 3A and FIG. 3B, a part of the projection pattern 4 projected on the projection surface 3 by the lighting device 10 is illustrated in an enlarged manner. As an example, "T" among the characters "STOP" illustrated in FIG. 1 is illustrated in FIG. 3A and FIG. 3B. The projection pattern 4 is displayed on the projection surface 3 with a fundamental period of spatial resolution r that is on the projection surface 3 and that is determined from a certain specified spatial resolution. The fundamental period of spatial resolution r means a unit pixel period length when the resolution required for displaying a lighting pattern as a system is displayed on the projection surface 3. In the example illustrated in FIG. 3A, the fundamental period of spatial resolution r is the width of a line having the smallest thickness in the projection pattern 4. In the example illustrated in FIG. 3A, the fundamental period of spatial resolution r is the width (thickness) of the horizontal line of the character "T". In the example illustrated in FIG. 3B, the fundamental period of spatial resolution r is the reciprocal of the fundamental spatial frequency of a dot constituting the projection pattern 4. In the example illustrated in FIG. 3B, the character "T" is formed by a plurality of dots, and the resolution fundamental frequency r is a width of one dot forming the character "T".

Figure 4:
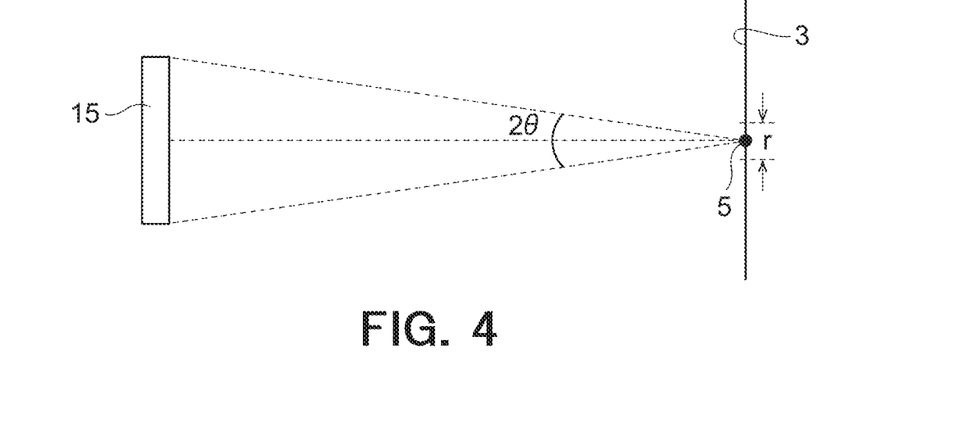
FIG. 4 is a view of the lighting system when a part of the projection surface is observed in a direction parallel to the projection surface.

FIG. 4 is an enlarged view of a part of the lighting system 1 when a part of the projection surface 3 is observed in a certain direction parallel to the projection surface 3. In the example illustrated in FIG. 4, the lighting system 1 is observed in a direction orthogonal to a width direction of the width of the line having the smallest thickness in the projection pattern 4. In the example illustrated in FIG. 4, a direction in which the fundamental pieces of diffractive optical element 15 are arranged is parallel to the projection surface 3. The emission surfaces 15a of the fundamental pieces of diffractive optical element 15 are parallel to the projection surface 3. In the example illustrated in FIG. 4, a part of the projection pattern 4 is projected with a fundamental period of spatial resolution r at an intersection position 5 of a perpendicular line drawn from the center of a certain fundamental piece of diffractive optical element 15 with respect to the projection surface 3. The position 5 is a position of the center of the fundamental period of spatial resolution r. For example, the position 5 is the position of the center of the width of the horizontal line of the character "T". When observed in the direction illustrated in FIG. 4, the projection pattern 4 is displayed with the fundamental period of spatial resolution r around the position 5 on the projection surface 3. The fundamental period of spatial resolution r is, for example, 100 μm or more and 1 m or less.

When observed in the direction illustrated in FIG. 4, a part of the projection pattern 4 projected at the position 5 on the projection surface 3 is formed with light diffracted by one or more fundamental pieces of diffractive optical element 15 in the diffractive optical element 14. The projection pattern 4 projected at the position 5 includes light having a wavelength λ. The wavelength λ is a visible light wavelength, and is, for example, 380 nm or more and 700 nm or less.

In FIG. 4, the fundamental piece of diffractive optical element 15 forming the projection pattern 4 projected at the position 5 is projected at an angle 2θ from the position 5. In other words, when observed in the direction illustrated in FIG. 4, two lines connecting the position 5 and both ends of the fundamental piece of diffractive optical element 15 projecting the projection pattern 4 including the light having the wavelength λ at the position 5 form the angle 2θ. The angle 2θ is, for example, $6 \times 10^{-5}°$ or more and 0.6° or less.

In the example illustrated in FIG. 4, the angle θ, the wavelength λ, and the fundamental period of spatial resolution r described above, that is, the fundamental period of spatial resolution r that is on the projection surface 3 and that is determined from the specified spatial resolution of the projection pattern 4 at the intersection position 5 of the perpendicular line drawn from the center of the certain fundamental piece of diffractive optical element 15 with respect to the projection surface 3, the angle θ that is a half of the angle 2θ projecting the fundamental piece of diffractive optical element 15 at the position 5, and the wavelength λ of the light included in the projection pattern 4 projected at the position 5 satisfy a relationship (i) below.

$$\sin \theta > \lambda/(6r) \qquad (i)$$

Preferably, the angle θ, the wavelength λ, and the fundamental period of spatial resolution r satisfy a relationship (i*) below.

$$\sin \theta > \lambda/(4r) \qquad (i^*)$$

More preferably, the angle θ, the wavelength λ, and the fundamental period of spatial resolution r satisfy a relationship (i**) below.

$$\sin \theta > \lambda/(2r) \qquad (i^{**})$$

Figure 5:
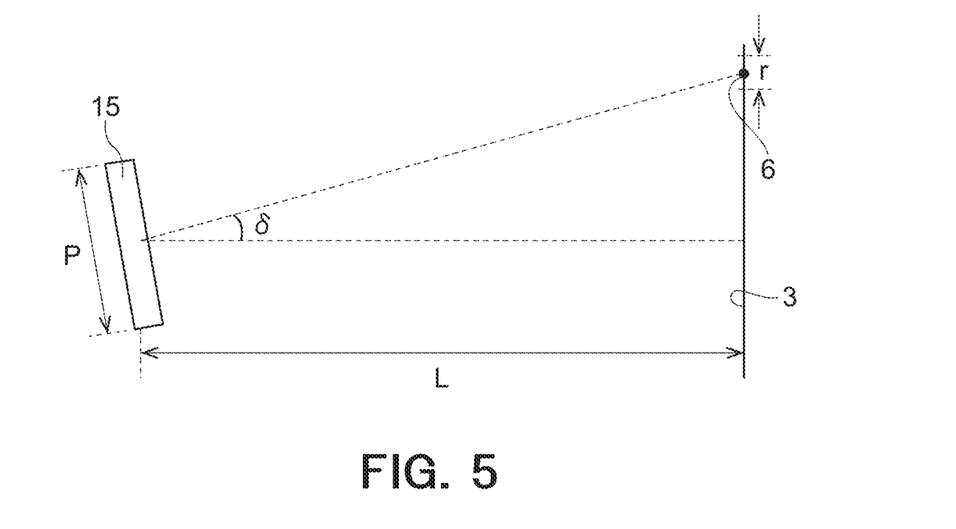
FIG. 5 is a view of the lighting system when another part of the projection surface is observed in the direction parallel to the projection surface.

FIG. 5 is an enlarged view of a part of the lighting system 1 when another part of the projection surface 3 is observed in a certain direction parallel to the projection surface 3. In the example illustrated in FIG. 5, as in the example illustrated in FIG. 4, the lighting system 1 is observed in a direction orthogonal to a width direction of the width of the line having the smallest thickness in the projection pattern 4. In the example illustrated in FIG. 5, a direction in which the fundamental pieces of diffractive optical element 15 are arranged may be parallel to the projection surface 3 or may be non-parallel to the projection surface 3. The emission surfaces 15a of the fundamental pieces of diffractive optical element 15 may be non-parallel to the projection surface 3. In the example illustrated in FIG. 5, at a certain position 6 on the projection surface 3, a part of the projection pattern 4 is projected with a fundamental period of spatial resolution r. The position 6 is a position of the center of the fundamental period of spatial resolution r, and is, for example, a position of the center of the width of the horizontal line of the character "T". When observed in a direction illustrated in FIG. 4, the projection pattern 4 is displayed with the fundamental period of spatial resolution r around the position 6 on the projection surface 3. The fundamental period of spatial resolution r is, for example, 100 μm or more and 1 m or less.

When observed in the direction illustrated in FIG. 5, a part of the projection pattern 4 projected at the certain position 6 on the projection surface 3 is formed with light diffracted by one or more fundamental pieces of diffractive optical element 15 in the diffractive optical element 14. The projection pattern 4 projected at the position 6 includes light having a wavelength λ. The wavelength λ is a visible light wavelength, and is, for example, 380 nm or more and 700 nm or less.

In FIG. 5, the projection surface 3 and the fundamental piece of diffractive optical element 15 projecting the projection pattern 4 including the light having the wavelength λ at the position 6 are distant by a distance L. More specifically, the length of a perpendicular line from the center of the fundamental piece of diffractive optical element 15 to the projection surface 3 is L. The length L is, for example, 0.5 m or more and 100 m or less.

When observed in the direction illustrated in FIG. 5, the fundamental piece of diffractive optical element 15 projecting the projection pattern 4 including the light having the wavelength λ at the position 6 extends with a length p. The length p of the fundamental piece of diffractive optical element 15 means a length of a cross section of the fundamental piece of diffractive optical element 15 in a plane including a direction in which the fundamental period of spatial resolution r extends and a direction connecting the center of the fundamental piece of diffractive optical element 15 and the center of the fundamental period of spatial resolution r, for example, an observation plane in which another part of the projection surface 3 is observed in a certain direction parallel to the projection surface 3 as illustrated in FIG. 5. The length p is, for example, 100 μm or more and 5 mm or less.

In the example illustrated in FIG. 5, a line connecting the position 6 and the center of the fundamental piece of diffractive optical element 15 projecting the projection pattern 4 including the light having the wavelength λ at the position 6 forms an angle δ with respect to the perpendicular line from the center of the fundamental piece of diffractive optical element 15 to the projection surface 3. The angle δ may be 0°, but is preferably more than 0°, more preferably 60° or more, and further preferably 80° or more. The position 6 at which the projection pattern 4 is projected is preferably a position shifted from the center of the fundamental piece of diffractive optical element 15. The projection pattern 4 is preferably projected on the projection surface 3 in a direction shifted from a front direction of the lighting device 10.

In the example illustrated in FIG. 5, the length L, the wavelength λ, the fundamental period of spatial resolution r, the length p, and the angle δ described above, that is, the length L of the perpendicular line from the center of the fundamental piece of diffractive optical element 15 to the projection surface 3, the fundamental period of spatial resolution r of the projection pattern 4 at the certain position 6 on the projection surface 3, the length p of the cross section of the fundamental piece of diffractive optical element 15 in the plane including the direction in which the fundamental period of spatial resolution r extends and the direction connecting the center of the fundamental piece of diffractive optical element 15 and the center of the fundamental period of spatial resolution r, the angle δ formed by the line connecting the position 6 and the center of the fundamental piece of diffractive optical element 15 with respect to the perpendicular line from the center of the fundamental piece of diffractive optical element 15 to the projection surface 3, and the wavelength λ of the light included in the projection pattern 4 projected at the position 6 satisfy a relationship (ii) below.

$$L\lambda/(rp \cos^2 \delta) < 3 \qquad \text{(ii)}$$

Preferably, the length L, the wavelength λ, the fundamental period length r, the length p, and the angle δ satisfy a relationship (ii*) below.

$$L\lambda/(rp \cos^2 \delta) < 2 \qquad \text{(ii*)}$$

More preferably, the length L, the wavelength λ, the fundamental period length r, the length p, and the angle δ satisfy a relationship (ii**) below.

$$L\lambda/(rp \cos^2 \delta) < 1 \qquad \text{(ii**)}$$

Next, a method of designing the lighting system 1 will be described.

The lighting system 1 is designed so that the projection pattern 4 is appropriately projected on the projection surface 3. First, a projection pattern 4 to be projected on the projection surface 3 is determined. Specifically, in order that the projection pattern 4 can display predetermined information on the projection surface 3, a fundamental period of spatial resolution r that is on the projection surface 3 and that is determined from a specified spatial resolution of the projection pattern 4 at an intersection position 5 of a perpendicular line drawn from the center of a certain fundamental piece of diffractive optical element 15 with respect to the projection surface 3, and a wavelength λ of light included in the projection pattern 4 at the position 5 are determined. Then, a positional relationship between the projection surface 3 and the lighting device 10 is determined so that the projection pattern 4 can be appropriately projected. Specifically, a positional relationship between the projection surface 3 and the lighting device 10 is determined so that an angle θ that is a half of an angle projecting the fundamental piece of diffractive optical element 15 at the position 5 satisfies a relationship (i) below.

$$\sin \theta > \lambda/(6r) \qquad \text{(i)}$$

Preferably, the positional relationship between projection surface 3 and the lighting device 10 is determined so as to satisfy a relationship (i*) below.

$$\sin \theta > \lambda/(4r) \qquad \text{(i*)}$$

More preferably, the positional relationship between projection surface 3 and the lighting device 10 is determined so as to satisfy a relationship (i**) below.

$$\sin \theta > \lambda/(2r) \qquad (\text{i**})$$

Alternatively, the lighting system 1 is designed as follows. First, as in the above-described designing method, a fundamental period of spatial resolution r that is on the projection surface 3 and that is determined from a specified spatial resolution of the projection pattern 4 at a certain position 6 on the projection surface 3, and a wavelength λ of light included in the projection pattern 4 at the position 6 are determined. Next, a length p of the fundamental piece of diffractive optical element 15, more specifically, a length p of a cross section of the fundamental piece of diffractive optical element 15 in a plane including a direction in which the fundamental period of spatial resolution r extends and a direction connecting the center of the fundamental piece of diffractive optical element 15 and the center of the fundamental period of spatial resolution r is determined. Then, a positional relationship between the projection surface 3 and the lighting device 10 is determined so that the projection pattern 4 formed by the fundamental piece of diffractive optical element 15 can be appropriately projected. Specifically, a positional relationship between the projection surface 3 and the lighting device 10 is determined so that a length L of a perpendicular line from the center of the fundamental piece of diffractive optical element 15 to the projection surface 3 and an angle δ formed by a line connecting the position 6 and the center of the fundamental piece of diffractive optical element 15 with respect to the perpendicular line from the center of the fundamental piece of diffractive optical element 15 to the projection surface 3 satisfy a relationship (ii) below.

$$L\lambda/(rp \cos^2 \delta) < 3 \qquad (\text{ii})$$

Preferably, the positional relationship between the projection surface 3 and the lighting device 10 is determined so as to satisfy a relationship (ii*) below.

$$L\lambda/(rp \cos^2 \delta) < 2 \qquad (\text{ii*})$$

More preferably, the positional relationship between the projection surface 3 and the lighting device 10 is determined so as to satisfy a relationship (ii**) below.

$$L\lambda/(rp \cos^2 \delta) < 1 \qquad (\text{ii**})$$

In the lighting device of the related art, particularly when the projection surface is located far from the lighting device, even though the projection pattern is projected from the lighting device on the projection surface, the projection pattern may only be displayed unsharply. For example, the unsharp projection pattern does not allow an observer to appropriately recognize information displayed by the projection pattern. It is desirable to appropriately project the projection pattern on the projection surface by the lighting device.

In general, the larger the size of the diffractive optical element in the lighting device, more specifically, the larger the size of the fundamental piece of diffractive optical element included in the diffractive optical element, the sharper the projection pattern can be displayed on the projection surface. However, when the fundamental piece of diffractive optical element is increased in size, the cost for appropriately designing the diffraction characteristics of the fundamental piece of diffractive optical element and the cost for manufacturing the fundamental piece of diffractive optical element increase. It is preferable to appropriately project the projection pattern on the projection surface while suppressing an increase in the size of the fundamental piece of diffractive optical element.

The sharpness of the projection pattern depends on the positional relationship between the fundamental piece of diffractive optical element in the lighting device and the projection surface. By appropriately setting the positional relationship between the fundamental piece of diffractive optical element in the lighting device and the projection surface, the projection pattern can be sharply projected so as to be recognizable. As a result of repeated experiments by the inventors of the present disclosure, specifically, by setting the positional relationship between the fundamental piece of diffractive optical element and the projection surface as follows, the projection pattern could be sharply projected on the projection surface.

As in the present embodiment, a fundamental period of spatial resolution r that is on the projection surface 3 and that is determined from a specified spatial resolution of the projection pattern 4 at an intersection position 5 of a perpendicular line drawn from the center of a certain fundamental piece of diffractive optical element 15 with respect to the projection surface 3, an angle θ that is a half of an angle 2θ projecting the fundamental piece of diffractive optical element 15 at the position 5, and a wavelength λ of light included in the projection pattern 4 projected at the position 5 satisfy a relationship (i) below, and thus the projection pattern 4 can be sharply projected on the projection surface 3 so as to be recognizable.

$$\sin \theta > \lambda/(6r) \qquad (\text{i})$$

The angle θ, the wavelength λ, and the fundamental period of spatial resolution r satisfy a relationship (i*) below, and thus the projection pattern 4 is sharply projected on the projection surface 3 so as to be clearly recognized.

$$\sin \theta > \lambda/(4r) \qquad (\text{i*})$$

The angle θ, the wavelength λ, and the fundamental period of spatial resolution r satisfy a relationship (i) below, and thus the projection pattern 4 is sharply projected on the projection surface 3 so that a difference between a portion where the projection pattern 4 is displayed and a portion where the projection pattern 4** is not displayed is more clearly recognized.

$$\sin \theta > \lambda/(2r) \qquad (\text{i**})$$

Alternatively, as in the present embodiment, a length L of a perpendicular line from the center of the fundamental piece of diffractive optical element 15 to the projection surface 3, a fundamental period of spatial resolution r that is on the projection surface 3 and that is determined from a specified spatial resolution of the projection pattern 4 at a certain position 6 on the projection surface 3, a length p of a cross section of the fundamental piece of diffractive optical element 15 in a plane including a direction in which the fundamental period of spatial resolution r extends and a direction connecting the center of the fundamental piece of diffractive optical element 15 and the center of the fundamental period of spatial resolution r, an angle δ formed by a line connecting the position 6 and the center of the fundamental piece of diffractive optical element 15 with respect to the perpendicular line from the center of the fundamental piece of diffractive optical element 15 to the projection surface 3, and a wavelength λ of light included in the projection pattern 4 projected at the position 6 satisfy a relationship (ii) below, and thus the projection pattern 4 can be sharply projected on the projection surface 3 so as to be recognizable.

$$L\lambda/(rp\cos^2\delta)<3 \tag{ii}$$

The length L, the wavelength λ, the fundamental period of spatial resolution r, the length p, and the angle δ satisfy a relationship (ii*) below, and thus the projection pattern 4 is sharply projected on the projection surface 3 so as to be clearly recognized.

$$L\lambda/(rp\cos^2\delta)<2 \tag{ii*}$$

The length L, the wavelength λ, the fundamental period of spatial resolution r, the length p, and the angle δ satisfy a relationship (ii) below, and thus the projection pattern 4 is sharply projected on the projection surface 3 so that a difference between a portion where the projection pattern 4 is displayed and a portion where the projection pattern 4** is not displayed is more clearly recognized.

$$L\lambda/(rp\cos^2\delta)<1 \tag{ii**}$$

By satisfying any one of the above-described relationships, the projection pattern 4 can be sharply projected without making the fundamental piece of diffractive optical element 15 larger than necessary. The cost for designing or manufacturing the fundamental piece of diffractive optical element 15 can be reduced.

In particular, the angle δ formed by the line connecting the position 6 and the center of the fundamental piece of diffractive optical element 15 with respect to the perpendicular line from the center of the fundamental piece of diffractive optical element 15 to the projection surface 3 is larger than 0°. In such a case, the size of the minimum resolution spot on the projection surface 3 that can be provided by the lighting system 1 is greatly influenced by the angle δ. By satisfying any relational expression of (ii), (ii*), or (ii) in which the influence of the angle δ is taken into consideration, the projection pattern 4 can be projected on the sufficiently far projection surface 3 with the light from the lighting device 10** so that the fundamental period of spatial resolution r based on the specified spatial resolution can be discriminated.

The projection pattern 4 includes light in a visible light wavelength range and/or an electromagnetic wave having a wavelength in an infrared range. Since the projection pattern 4 includes the light in the visible light wavelength range, a predetermined pattern can be observed by an observer displayed on the projection surface 3. Since the projection pattern 4 includes the electromagnetic wave having the wavelength in the infrared range, the lighting system 1 can be used as a sensor. Since the projection pattern 4 includes both the light in the visible light wavelength range and the electromagnetic wave having the wavelength in the infrared range, the lighting system 1 can be used as a sensor corresponding to the pattern displayed on the projection surface 3.

In the present embodiment, the lighting system 1 is designed so that an angle θ that is a half of an angle projecting the fundamental piece of diffractive optical element 15 at the position 5 satisfies a relationship (i) below.

$$\sin\theta>\lambda/(6r) \tag{i}$$

In the lighting system 1 designed in this way, the projection pattern 4 is sharply projected on the projection surface 3 by the lighting device 10 so as to be recognizable.

The lighting system 1 is designed so as to satisfy a relationship (i*) below.

$$\sin\theta>\lambda/(4r) \tag{i*}$$

In the lighting system 1 designed in this way, the projection pattern 4 is sharply projected on the projection surface 3 so as to be clearly recognized.

The lighting system 1 is designed so as to satisfy a relationship (i**) below.

$$\sin\theta>\lambda/(2r) \tag{i**}$$

In the lighting system 1 designed in this way, the projection pattern 4 is sharply projected on the projection surface 3 so that a difference between a portion where the projection pattern 4 is displayed and a portion where the projection pattern 4 is not displayed is more clearly recognized.

Alternatively, the lighting system 1 is designed so that a length L of a perpendicular line from the center of the fundamental piece of diffractive optical element 15 to the projection surface 3 and an angle δ formed by a line connecting the position 6 and the center of the fundamental piece of diffractive optical element 15 with respect to the perpendicular line from the center of the fundamental piece of diffractive optical element 15 to the projection surface 3 satisfy a relationship (ii) below.

$$L\lambda/(rp\cos^2\delta)<3 \tag{ii}$$

In the lighting system 1 designed in this way, the projection pattern 4 is sharply projected on the projection surface 3 by the lighting device 10 so as to be recognizable.

The lighting system 1 is designed so as to satisfy a relationship (ii*) below.

$$L\lambda/(rp\cos^2\delta)<2 \tag{ii*}$$

In the lighting system 1 designed in this way, the projection pattern 4 is sharply projected on the projection surface 3 so as to be clearly recognized.

The lighting system 1 is designed so as to satisfy a relationship (ii**) below.

$$L\lambda/(rp\cos^2\delta)<1 \tag{ii**}$$

In the lighting system 1 designed in this way, the projection pattern 4 is sharply projected on the projection surface 3 so that a difference between a portion where the projection pattern 4 is displayed and a portion where the projection pattern 4 is not displayed is more clearly recognized.

By designing the lighting system 1 so as to satisfy any one of the above-described relationships, the projection pattern 4 can be sharply projected without making the fundamental piece of diffractive optical element 15 larger than necessary. The cost for designing or manufacturing the fundamental piece of diffractive optical element 15 can be reduced.

As described above, a lighting system 1 of the present embodiment includes a projection surface 3, and a lighting device 10 that projects a projection pattern 4 on a projection surface 3; the lighting device 10 includes a light source 12 that emits coherent light, and a fundamental piece of diffractive optical element 15 that diffracts the coherent light from the light source 12 to form the projection pattern 4; and a fundamental period of spatial resolution r that is on the projection surface 3 and that is determined from a specified spatial resolution of the projection pattern 4 at an intersection position 5 of a perpendicular line drawn from a center of a certain fundamental piece of diffractive optical element 15 with respect to the projection surface 3, an angle θ that is a half of an angle projecting the fundamental piece of diffractive optical element 15 at the position 5, and a wavelength λ of light included in the projection pattern 4 projected at the position 5 satisfy a relationship (i) below.

$$\sin \theta > \lambda/(6r) \qquad \text{(i)}$$

According to such a lighting system 1, the projection pattern 4 can be sharply projected so as to be recognizable without making the fundamental piece of diffractive optical element 15 larger than necessary.

Aspects of the present disclosure are not limited to the above-described embodiment and include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents determined in the claims and equivalents thereof.

REFERENCE SIGNS LIST 1 lighting system
3 projection surface
4 projection pattern
5 position
6 position
10 lighting device
12 light source
13 shaping optical system
14 diffractive optical element
15 fundamental piece of diffractive optical element

The invention claimed is:

1. A lighting system comprising:
a projection surface; and
a lighting device that projects a projection pattern on the projection surface,
wherein the lighting device includes a light source that emits coherent light, and a diffractive optical element that diffracts the coherent light from the light source to form the projection pattern,
wherein the diffractive optical element includes a plurality of fundamental pieces of diffractive optical element two-dimensionally arranged in a direction parallel to the projection surface, and
wherein a fundamental period of spatial resolution r that is on the projection surface and that is determined from a specified spatial resolution of the projection pattern at an intersection position of a perpendicular line drawn from a center of certain one of the fundamental pieces of diffractive optical element with respect to the projection surface, an angle θ that is a half of an angle projecting the fundamental piece of diffractive optical element at the position, and a wavelength λ of light included in the projection pattern projected at the position satisfy a relationship (i) below.

$$\sin \theta > \lambda/(6r) \qquad \text{(i)}$$

2. A lighting system comprising:
a projection surface; and
a lighting device that projects a projection pattern on the projection surface,
wherein the lighting device includes a light source that emits coherent light, and a diffractive optical element that diffracts the coherent light from the light source to form the projection pattern,
wherein the diffractive optical element includes a plurality of fundamental pieces of diffractive optical element, and
wherein a length L of a perpendicular line from a center of the fundamental piece of diffractive optical element to the projection surface, a fundamental period of spatial resolution r that is on the projection surface and that is determined from a specified spatial resolution of the projection pattern at a certain position on the projection surface, a length p of a cross section of the fundamental piece of diffractive optical element in a plane including a direction in which the fundamental period of spatial resolution r extends and a direction connecting the center of the fundamental piece of diffractive optical element and a center of the fundamental period of spatial resolution r, an angle δ formed by a line connecting the position and the center of the fundamental piece of diffractive optical element with respect to the perpendicular line from the center of the fundamental piece of diffractive optical element to the projection surface, and a wavelength λ of light included in the projection pattern projected at the position satisfy a relationship (ii) below.

$$L\lambda/(rp \cos^2 \delta) < 3 \qquad \text{(ii)}$$

3. The lighting system according to claim 2, wherein the angle δ formed by the line connecting the position and the center of the fundamental piece of diffractive optical element with respect to the perpendicular line from the center of the fundamental piece of diffractive optical element to the projection surface is larger than 0°.

4. The lighting system according to claim 1 wherein the projection pattern includes light having a wavelength in a visible light wavelength range and/or an electromagnetic wave having a wavelength in an infrared range.

5. A method of designing a lighting system that projects a projection pattern on a projection surface by a lighting device, the method comprising:
a step of determining a fundamental period of spatial resolution r that is on the projection surface and that is determined from a specified spatial resolution of the projection pattern at an intersection position of a perpendicular line drawn from a center of a certain fundamental piece of diffractive optical element with respect to the projection surface, and a wavelength λ of light included in the projection pattern at the position; and
a step of determining a positional relationship between the projection surface and the lighting device so that an angle θ that is a half of an angle projecting the fundamental piece of diffractive optical element at the position satisfies a relationship (i) below.

$$\sin \theta > \lambda/(6r) \qquad \text{(i)}$$

6. A method of designing a lighting system that projects a projection pattern on a projection surface by a lighting device, the method comprising:
a step of determining a fundamental period of spatial resolution r that is on the projection surface and that is determined from a specified spatial resolution of the projection pattern at a certain position on the projection surface, and a wavelength λ of light included in the projection pattern at the position;
a step of determining a length p of a cross section of a fundamental piece of diffractive optical element in a plane including a direction in which the fundamental period of spatial resolution r extends and a direction connecting a center of the fundamental piece of diffractive optical element and a center of the fundamental period of spatial resolution r; and a step of determining a positional relationship between the projection surface and the lighting device so that a length L of a perpendicular line from the center of the fundamental piece of diffractive optical element to the projection surface and an angle δ formed by a line connecting the position and the center of the fundamental piece of diffractive optical element with respect to the perpendicular line from the center of the fundamental piece of diffractive optical element to the projection surface satisfy a relationship (ii) below.

$$L\lambda/(rp \cos^2 \delta) < 3 \quad \text{(ii)}$$

7. The lighting system according to claim 2, wherein the projection pattern includes light having a wavelength in a visible light wavelength range and/or an electromagnetic wave having a wavelength in an infrared range.

\* \* \* \* \*